(12) United States Patent  
Nozaki et al.

(10) Patent No.: US 7,961,184 B2  
(45) Date of Patent: Jun. 14, 2011

(54) GRAPHICS PROCESSING APPARATUS AND GRAPHICS PROCESSING METHOD

(75) Inventors: Takashi Nozaki, Tokyo (JP); Natsuo Koda, Kanagawa (JP); Hiroki Kato, Kanagawa (JP); Hirotoshi Maegawa, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 669 days.

(21) Appl. No.: 11/495,187

(22) Filed: Jul. 28, 2006

(65) Prior Publication Data

US 2007/0035552 A1   Feb. 15, 2007

(30) Foreign Application Priority Data

Aug. 15, 2005   (JP) ................................. 2005-235563

(51) Int. Cl.  
*G06T 17/00* (2006.01)

(52) U.S. Cl. .............. 345/420; 345/419; 463/1; 463/40; 463/42

(58) Field of Classification Search .......... 345/419–420, 345/473–475  
See application file for complete search history.

(56) References Cited

U.S. PATENT DOCUMENTS

| | | | |
|---|---|---|---|
| 5,793,376 A | 8/1998 | Tanaka et al. | |
| 6,184,901 B1 * | 2/2001 | Silva et al. | 345/474 |
| 6,448,971 B1 * | 9/2002 | Seefeldt et al. | 345/475 |
| 6,684,255 B1 * | 1/2004 | Martin | 709/231 |
| 7,289,941 B2 * | 10/2007 | Bordes | 703/6 |
| 2004/0053686 A1 * | 3/2004 | Pacey et al. | 463/25 |

FOREIGN PATENT DOCUMENTS

| | | |
|---|---|---|
| JP | 11-16001 | 1/1999 |
| JP | 11-185055 | 7/1999 |
| JP | 2003-162735 | 6/2003 |

OTHER PUBLICATIONS

Havok Software, www.havok.com (Internet Archive), accessed Jun. 11, 2005.*  
Feng et al., A Traffic Characterization of Popular On-line Games, IEEE/ACM Transactions on Networking, vol. 13, No. 3, Jun. 2005, pp. 488-500.*  
Sotamaa, Computer Game Modding, Intermediality and Participatory Culture, http://www.imv.au.dk/eng/academic/pdf_files/Sotamaa.pdf, accessed Feb. 10, 2004 from Internet Archive.*

(Continued)

*Primary Examiner* — Xiao M Wu  
*Assistant Examiner* — Charles Tseng  
(74) *Attorney, Agent, or Firm* — Katten Muchin Rosenman LLP

(57) ABSTRACT

A graphics processing unit is provided. A basic model display processing unit generates and displays rendering data based on three-dimensional model information on an object to be rendered. An effect model processing unit performs processing for applying a predetermined effect to a three-dimensional model of the object. A basic model storing unit stores a basic model file which defines a basic form of the object. An effect model storing unit stores an effect model file which describes the effect to be applied to the basic model in order to create a variation form while maintaining the identity of the basic form of the object. An effect processing unit applies the effect described in the effect model file to the basic model of the object, thereby changing the basic model. A rendering unit performs graphics processing for displaying a variation of the object based on the basic model changed.

10 Claims, 11 Drawing Sheets

OTHER PUBLICATIONS

Hagan, What's a LAN Party?, http://techreviewer.com/viewpage.cfm/ui/04061811749, accessed Jun. 28, 2004 from Internet Archive.*

Written Amendment dated Jan. 19, 2009, from the corresponding Japanese Application.

Notification of Reason(s) for Refusal dated Feb. 24, 2009, from the corresponding Japanese Application.

Koichi Emura, et al. "Scenario-driven Motion Synthesis for Character Animation" Research Report in Information Processing Society of Japan, vol. 2004, No. 126, pp. 83-87, Dec. 10, 2004.

Hiroshi Maruo. "New Version of Maya Capable of Expressing Even a Strand of Hair or Texture of Fabric" Nikkei Design, Nikkei Business Publications, Inc., No. 203, p. 31, Apr. 24, 2004.

Notification of Reason(s) for Refusal dated May 26, 2009, from the corresponding Japanese Application.

* cited by examiner

```
BEGIN_RULE
NAME Layer5
TYPE 0
                    ⎫
BEGIN_BOUNDARY      ⎪
TYPE 1              ⎪
EDGE_LENGTH 30.0    ⎬ SHAPE
BEGIN_PARAM         ⎪ INFOR-
0.0                 ⎪ MATION
0.0                 ⎪
40.0                ⎪
40.0                ⎪
END_PARAM           ⎪
END_BOUNDARY        ⎭

⎫
BEGIN_AFFECTORHEIGHT⎪
TYPE 0              ⎪
BEGIN_PARAM         ⎪
-15                 ⎬ NON-
END_PARAM           ⎪ SHAPE
END_AFFECTORHEIGHT  ⎪ INFOR-
                    ⎪ MATION
BEGIN_AFFECTORCOLOR ⎪
TYPE 1              ⎪
BEGIN_PARAM         ⎪
0.0                 ⎪
0.3                 ⎪
0.6                 ⎪
1                   ⎪
4                   ⎪
1.0                 ⎪
0.75                ⎪
6                   ⎪
0.55                ⎪
END_PARAM           ⎪
END_AFFECTORCOLOR   ⎭

END_RULE
```
FIG.7A  50a

```
BEGIN_RULE
NAME Layer6
TYPE 0

BEGIN_BOUNDARY
TYPE 1
BEGIN_PARAM
0.0
0.0
25.0
25.0
END_PARAM
END_BOUNDARY

BEGIN_AFFECTORHEIGHT
TYPE 0
BEGIN_PARAM
-5
END_PARAM
END_AFFECTORHEIGHT

BEGIN_AFFECTORCOLOR
TYPE 1
BEGIN_PARAM
0.3
0.4
0.0
1
4
1.0
0.75
6
0.55
END_PARAM
END_AFFECTORCOLOR

END_RULE
```
FIG.7B  50b

```
BEGIN_RULE
NAME Layer7
TYPE 0

BEGIN_BOUNDARY
TYPE 1
BEGIN_PARAM
0.0
0.0
15.0
15.0
END_PARAM
END_BOUNDARY

BEGIN_AFFECTORHEIGHT
TYPE 0
BEGIN_PARAM
5
END_PARAM
END_AFFECTORHEIGHT

BEGIN_AFFECTORCOLOR
TYPE 1
BEGIN_PARAM
0.1
0.8
0.3
1
4
1.0
0.75
6
0.55
END_PARAM
END_AFFECTORCOLOR

END_RULE
```
FIG.7C  50c

```
BEGIN_RULE
NAME Layer8
TYPE 0

BEGIN_BOUNDARY
TYPE 1
BEGIN_PARAM
0.0
0.0
10.0
10.0
END_PARAM
END_BOUNDARY

BEGIN_AFFECTORHEIGHT
TYPE 0
BEGIN_PARAM
10
END_PARAM
END_AFFECTORHEIGHT

BEGIN_AFFECTORCOLOR
TYPE 1
BEGIN_PARAM
0.1
0.2
0.3
1
4
1.0
0.75
6
0.55
END_PARAM
END_AFFECTORCOLOR

END_RULE
```
FIG.7D  50d

GRAPHICS PROCESSING APPARATUS AND GRAPHICS PROCESSING METHOD

BACKGROUND OF THE INVENTION

1. Field of the Invention

This invention relates to a graphics processing apparatus and a graphics processing method.

2. Description of the Related Art

Game, simulation, and other applications that can be played by users operating three-dimensional objects such as characters are available on personal computers and game consoles. As graphics functions implemented in the computers and game consoles advance in performance, it becomes possible to generate and display high-quality images in real time. In such applications, users are increasingly requesting higher levels for the operability and the graphics quality of the three-dimensional objects.

For a wider variety of ways to enjoy game applications and the like, various types of characters to appear are prepared for the games and the like in advance so that users can select according to their preferences. When developing game software, one of the important factors for satisfying user demands is to design many different varieties of characters.

In game applications and the like, user-operated characters change into various forms depending on their effects. For example, some characters change shape when walking on the ground or when flying in the air. Characters can also develop greater powers in accordance with the progress of the games, or be equipped with various kinds of items. In some cases, the effect of a character can affect objects including other characters, and change the objects. For example, walking characters may leave footprints on the ground. Match-up games and the like may implement such an outcome of effect as leaving scars on opponent characters.

When developing the game software, character models must be prepared by assuming all possible results of character effects in advance. Character models must also be prepared even by assuming situations where two or more outcomes of effect overlap each other, for example, a mixed setting in which a character is cut with a sword and kicked away as well. Since all possible character models must be designed in advance, designing the character models is complex with many complications requiring a lot of man-hours.

Besides, in such applications as an online match-up game, changing a character model in one terminal requires that updated information be transmitted to the other terminals. It takes time to transfer polygon data about the character model updated, which makes the graphics processing difficult to perform in real time.

SUMMARY OF THE INVENTION

The present invention has been achieved in view of the foregoing problems. It is thus a general purpose of the present invention to provide a graphics processing apparatus and a graphics processing method which can render variations of objects to be rendered with high efficiency.

To solve the foregoing problems, a graphics processing apparatus according to one of the embodiments of the present invention comprises: a storing unit which stores a basic model file and an effect model file, the basic model file describing a basic model for defining a three-dimensional basic form of an object to be rendered, the effect model file describing an effect to be applied to the basic model in order to create a variation form while maintaining identity of the basic form of the object to be rendered; an effect processing unit which applies the effect described in the effect model file to the basic model, thereby changing the basic model; and a graphics processing unit which performs graphics processing for displaying a variation of the object to be rendered on-screen based on the basic model changed.

Here, "the basic form of the object to be rendered" shall refer to one that includes not only the shape of the object to be rendered but also its non-shape attributes such as colors and textures. The phrase "maintaining identity of the basic form of the object to be rendered" shall refer to situations where the basic form of the object to be rendered remains intact. For example, it applies to the case whereby a three-dimensional polygon model of the object to be rendered remains topologically unchanged in terms of polygon connection etc.

Another embodiment of the present invention also provides a graphics processing apparatus. This apparatus is a network-connected graphics processing apparatus for performing graphics processing of an object to be rendered in a virtual shared space. The apparatus comprises: a receiving unit which receives via a network a basic model file and an effect model file, the basic model file describing a basic model for defining a three-dimensional basic form of an object to be rendered, the effect model file describing an effect to be applied to the basic model in order to create a variation form while maintaining identity of the basic form of the object to be rendered; an effect processing unit which applies the effect described in the received effect model file to the basic model, thereby changing the basic model; and a graphics processing unit which performs graphics processing for displaying a variation of the object to be rendered on-screen based on the basic model changed.

Yet another embodiment of the present invention provides a graphics processing method. This method comprises: acquiring an effect model file if application of a predetermined effect to a basic model for defining a three-dimensional basic form of an object to be rendered creates a variation form while maintaining identity of the basic form of the object to be rendered, the effect model file describing the predetermined effect to be applied to the basic model; applying the predetermined effect described in the acquired effect model file to the basic model, thereby changing the basic model; and performing graphics processing for displaying a variation of the object to be rendered on-screen based on the basic model changed.

It should be appreciated that any combinations of the foregoing components, and any conversions of expressions of the present invention from/into methods, apparatuses, systems, computer programs, data structures, and the like are also intended to constitute applicable aspects of the present invention.

BRIEF DESCRIPTION OF THE DRAWINGS

FIGS. 7A to 7D are diagrams showing four layers of effect model files as an example where effects are defined across a plurality of layers;

DETAILED DESCRIPTION OF THE INVENTION

First Embodiment

Figure 1:
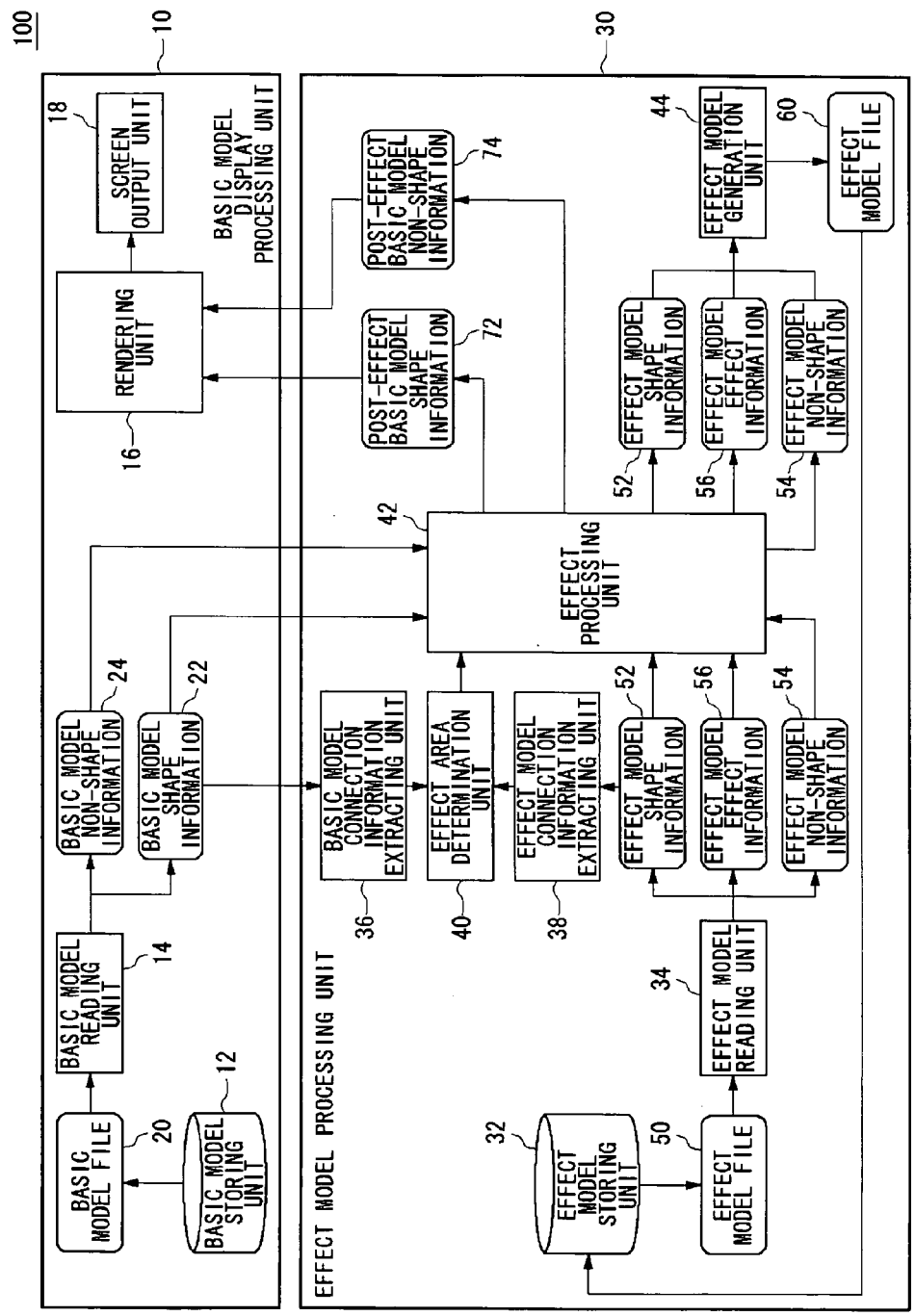
FIG. 1 is a block diagram of a graphics processing apparatus according to a first embodiment.

FIG. 1 is a block diagram of a graphics processing apparatus 100 according to a first embodiment. The graphics processing apparatus 100 includes a basic model display processing unit 10 and an effect model processing unit 30. The basic model display processing unit 10 generates rendering data to be displayed on a display unit based on three-dimensional model information on objects to be rendered. The effect model processing unit 30 performs processing for applying predetermined effects to three-dimensional models of the objects to be rendered, thereby changing the three-dimensional models locally.

The three-dimensional models of objects to be rendered define the basic forms of the objects to be rendered. Since topological and other identities of the objects to be rendered remain intact even if effects are applied by the effect model processing unit 30, the three-dimensional models will be referred to as "basic models." Meanwhile, models of the effects to be applied to the basic models of objects to be rendered will be referred to as "effect models." Moreover, the basic forms of objects to be rendered after the application of effects will be referred to as "variation forms."

The basic model display processing unit 10 includes a basic model storing unit 12, a basic model reading unit 14, a rendering unit 16, and a screen output unit 18.

The basic model storing unit 12 contains basic model files 20 which describe three-dimensional model information such as polygon data on objects to be rendered.

Figure 2A:
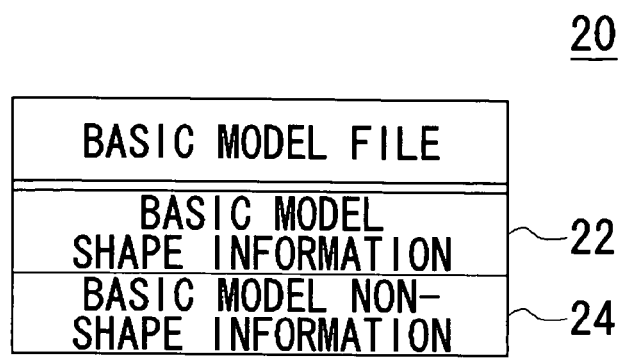
FIG. 2A is a diagram showing the data structure of a basic model file stored in the basic model storing unit of FIG. 1.

FIG. 2A shows the data structure of the basic model files 20. A basic model file 20 describes basic model shape information 22 and basic model non-shape information 24. The basic model shape information 22 pertains to the three-dimensional shape of an object, such as vertex coordinates, vertex colors, and texture coordinates. The basic model shape information 22 also includes polygon information and connection information such as scene graphs. The basic model non-shape information 24 refers to information other than the three-dimensional shape of the object, and includes texture data to be mapped onto polygon surfaces of the object and the intensity and direction of light the object will be irradiated with.

The basic model reading unit 14 reads a basic model file 20 from the basic model storing unit 12, and extracts the basic model shape information 22 and the basic model non-shape information 24 from the basic model file 20.

According to the steps for ordinary graphics processing, the basic model shape information 22 and the basic model non-shape information 24 are supplied to the rendering unit 16 so that the rendering unit 16 performs the graphics processing. In the present embodiment, the basic model shape information 22 and the basic model non-shape information 24 are supplied to the effect model processing unit 30 so that the effect model processing unit 30 applies a predetermined effect to the basic model of the object. The rendering unit 16 then renders the object to be rendered based on the basic model to which the predetermined effect has been applied.

The effect model processing unit 30 includes an effect model storing unit 32, an effect model reading unit 34, a basic model connection information extracting unit 36, an effect model connection information extracting unit 38, an effect area determination unit 40, an effect processing unit 42, and an effect model generation unit 44.

The basic model shape information 22 supplied from the basic model display processing unit 10 is input to the basic model connection information extracting unit 36 and the effect processing unit 42. The basic model non-shape information 24 is input to the effect processing unit 42.

The effect model storing unit 32 contains effect model files 50 which describe information on effect models or the models of effects to be applied to the basic models of objects to be rendered.

Figure 2B:
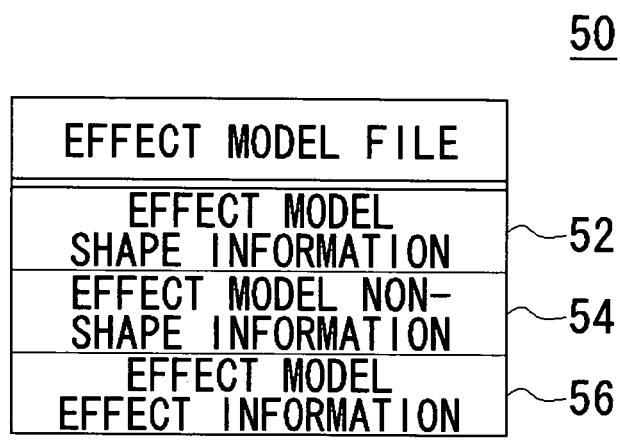
FIG. 2B is a diagram showing the data structure of an effect model file stored in the effect model storing unit of FIG. 1.

FIG. 2B shows the data structure of the effect model files 50. An effect model file 50 describes effect model shape information 52, effect model non-shape information 54, and effect model effect information 56.

The effect model shape information 52 pertains to three-dimensional shape, such as vertex coordinates, vertex colors, and texture coordinates of an effect model. The effect model shape information 52 also includes connection information such as vertex index information on polygons of the effect model. The effect model non-shape information 54 refers to information other than the shape of the effect model, and includes texture data to be mapped onto polygon surfaces of the effect model and information on irradiating light. The effect model effect information 56 describes the contents of the effect in terms of operations, such as an effect function which defines the effect as a function.

The effect model reading unit 34 reads an effect model file 50 from the effect model storing unit 32, and extracts the effect model shape information 52, the effect model non-effect shape information 54, and the effect model effect information 56.

The effect model file 50 for the effect model reading unit 34 to read from the effect model storing unit 32 need not be prepared in advance in order to be applied to the basic model of the object to be rendered which the basic model display processing unit 10 is going to render. That is, the effect model file 50 need not be one that is registered in the effect model storing unit 32 in advance as an effect model intended for the object to be rendered. In this case, it follows that an unexpected effect model is applied to the basic model of the object to be rendered. The unexpected effect model file 50 may be acquired from another graphics processing apparatus 100 over a network and temporarily stored into the effect model storing unit 32.

The effect model shape information 52 is input to the effect model connection information extracting unit 38 and the effect processing unit 42. The effect model non-shape information 54 and the effect model effect information 56 are input to the effect processing unit 42.

The basic model connection information extracting unit 36 extracts connection information on the basic model from the basic model shape information 22 input thereto, and supplies the extracted connection information on the basic model to the effect area determination unit 40. Meanwhile, the effect model connection information extracting unit 38 extracts connection information on the effect model from the effect model shape information 52 input thereto, and supplies the extracted connection information on the effect model to the effect area determination unit 40. For example, this connection information is given in the form of vertex indexes which indicate connection information on the vertexes and sides of each polygon of the basic model.

The effect area determination unit 40 refers to the connection information on the basic model of the object to be rendered and the connection information on the effect model to be applied to the object to be rendered, and determines the area of the object to be rendered where the effect is applied to. The effect area determination unit 40 supplies the information on the determined effect area to the effect processing unit 42.

The effect processing unit 42 refers to the basic model shape information 22, the basic model non-shape information 24, the effect model shape information 52, the effect model non-shape information 54, and the effect model effect information 56 input thereto. The effect processing unit 42 then applies the effect that is based on the effect model to the basic model of the object to be rendered within the effect area which is determined by the effect area determination unit 40.

More specifically, the effect processing unit 42 applies the shape of the effect model to the shape of the basic model according to the effect function, thereby changing the shape of the basic model, and generates post-effect basic model shape information 72. The effect processing unit 42 also applies the non-shape information of the effect model to the non-shape information of the basic model, thereby changing non-shape attributes of the basic model such as a texture, and generates post-effect basic model non-shape information 74. In this way, the effect processing unit 42 changes the form of the basic model of the object to be rendered both in terms of shape and non-shape. This change of form is made within the range where the identity of the basic form of the object to be rendered remains intact. The change may be local or restrictive, or may sometimes cover the entire form.

The effect processing unit 42 supplies the post-effect basic model shape information 72 and the post-effect basic model non-shape information 74 generated to the rendering unit 16. The rendering unit 16 refers to the post-effect basic model shape information 72 and the post-effect basic model non-shape information 74, and renders the object to be rendered based on the basic model that has been changed by the effect of the effect model. The rendering unit 16 thereby generates rendering data on a variation of the object to be rendered. The rendering unit 16 supplies the generated rendering data to the screen output unit 18. The screen output unit 18 displays the rendering data on the screen of the display unit.

Here, suppose that the effect model applied by the effect model processing unit 30 to the basic model of the object to be rendered is none of those registered as effect models intended for this object to be rendered. Then, processing for registering this effect model as a new effect model intended for the object to be rendered is performed. For this purpose, the effect processing unit 42 supplies the effect model shape information 52, the effect model non-shape information 54, and the effect model effect information 56, which are applied to the basic model of the object to be rendered, to the effect model generation unit 44.

The effect model generation unit 44 generates an updated effect model file 60 intended for the object to be rendered by using the effect model shape information 52, the effect model non-shape information 54, and the effect model effect information 56. The updated effect model file 60 is stored into the effect model storing unit 32 as a new effect model for the object to be rendered. Consequently, even when an effect model is not prepared for the basic model of the object to be rendered in advance, it can subsequently be used as an effect model to be applied to the basic model of the object to be rendered. In other words, if any effect model is provided, the same effect model can also be used to affect the basic models of different objects to be rendered, and generate variations of those basic models. This is advantageous because rendering objects of various forms can be created without requiring many man-hours.

The updated effect model file 60 is the effect model file 50 on which some restrictions are imposed. Once the basic model and the effect model file 50 are associated with each other, it is wasteful for the effect area determination unit 40 to calculate the effect area each time. The result of calculation is thus written to the updated effect model file 60 for caching purpose. The same holds for non-shape information. The result of calculation can thus be written to the updated effect model file 60 enabling high-speed operation the next time. While the effect model file 50 may be used for the basic models of any objects to be rendered universally, the updated effect model file 60 is dedicated only to the basic model of the corresponding object to be rendered to which this effect model is applied. It should be noted that, when other effect model files 50 are applied to the object to be rendered with additional changes in form, the updated effect model file 60 is overwritten with the updated result of recalculation.

Figure 3:
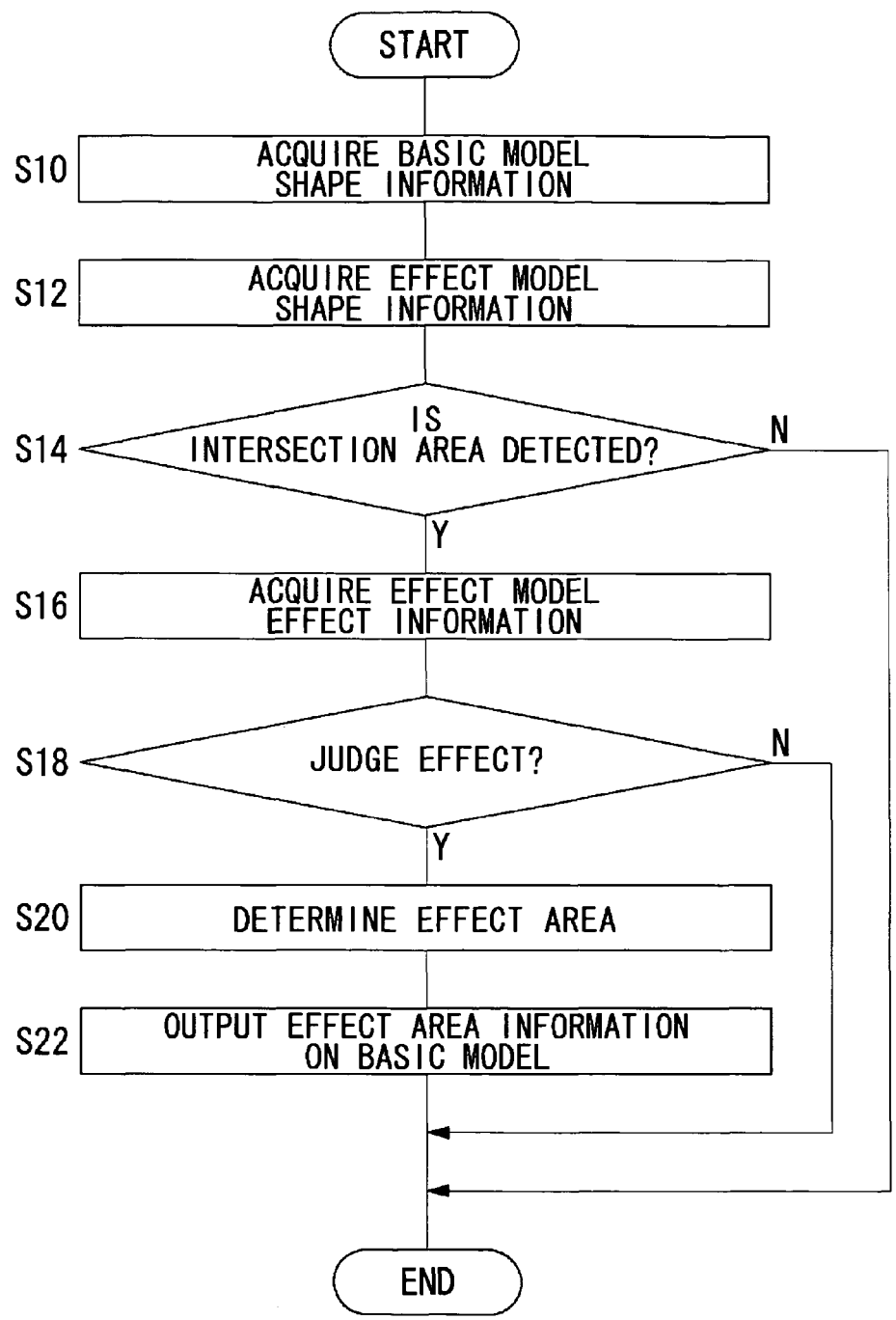
FIG. 3 is a flowchart for explaining the steps by which the effect area determination unit of FIG. 1 determines an effect area.

FIG. 3 is a flowchart for explaining the steps by which the effect area determination unit 40 determines an effect area.

The effect area determination unit 40 acquires the basic model shape information 22 on the object to be rendered (S10), and acquires the effect model shape information 52 to be applied to the object (S12).

With reference to the basic model shape information 22 and the effect model shape information 52, the effect area determination unit 40 detects whether the basic model of the object and the effect model to be applied to the object intersect each other in a three-dimensional space (S14). If no intersection area is detected (N at S14), the processing ends.

If an intersection area is detected (Y at S14), the effect area determination unit 40 acquires the effect model effect information 56 (S16). With reference to the effect model effect information 56, the effect area determination unit 40 judges if the effect reaches the intersection area (S18). The reason for judging the presence or absence of the effect is that the intersection area, if any, might not fall within the reach of the effect depending on the contents of the effect. If the effect does not reach (N at S18), the processing ends.

If the effect area determination unit 40 judges that the effect reaches the intersection area (Y at S18), the effect area determination unit 40 determines the effect area (S20), and outputs it as effect area information on the basic model of the object to be rendered (S22).

Figure 4:
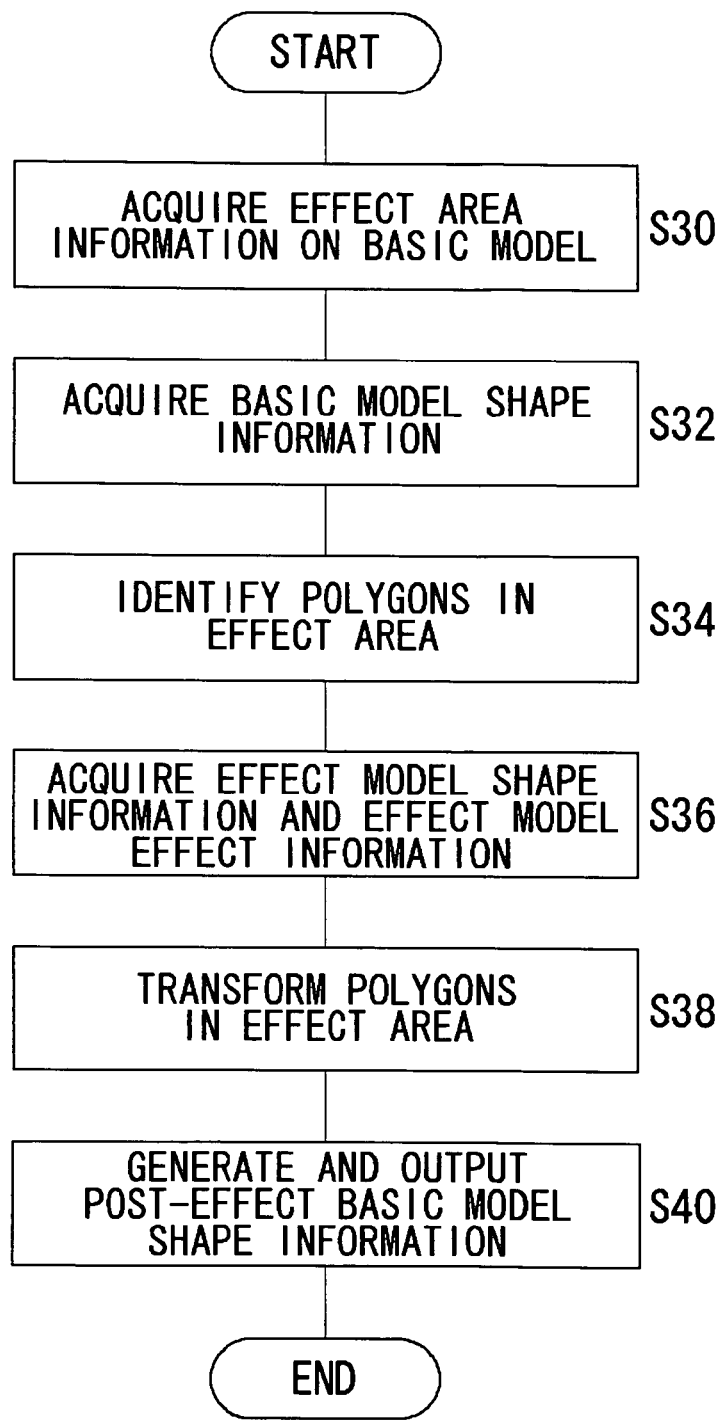
FIG. 4 is a flowchart for explaining the steps by which the effect processing unit of FIG. 1 processes an effect.

FIG. 4 is a flowchart for explaining the steps by which the effect processing unit 42 processes an effect.

The effect processing unit 42 acquires the effect area information on the basic model of the object to be rendered from the effect area determination unit 40 (S30). The effect processing unit 42 also acquires the basic model shape information 22 (S32).

The effect processing unit 42 identifies the polygons of the basic model to fall within the effect area based on the effect area information and the basic model shape information 22 (S34).

The effect processing unit 42 acquires the effect model shape information 52 and the effect model effect information 56 (S36). Based on the effect model shape information 52 and the effect model effect information 56, the effect processing unit 42 transforms the polygons of the basic model in the effect area (S38).

The effect processing unit 42 generates and outputs post-effect basic model shape information 72 based on the result of the polygon transformation (S40).

Although description thereof has been omitted, the effect processing unit 42 also applies effects other than in shape, such as a color change and texture mapping within the effect area of the basic model, if the effect model file 50 contains effect model non-shape information 54. The effect processing unit 42 then generates and outputs post-effect basic model non-shape information 74.

Hereinafter, the description format of the effect model file 50 will be explained with a concrete example to show how an effect model is applied to the basic model of an object to be rendered and how the basic model undergoes the effect.

Effect model files 50 can be defined in units of layers. Effects described in a plurality of effect model files 50 can be applied to a basic model by overlaying and synthesizing the effects described in the respective layers of effect model files 50.

Effects are given by describing various types of rules layer by layer. Rules are written in plain text files. The rules to be described in each layer include attribute information for the layer, the range of application of the rules, height, color, shader programs, and parameters for effect operations.

When synthesizing the layers of effects, synthesis operations are performed on each of the rules such as height, color, and shaders depending on layer synthesis types which are described as the attributes of the respective layers. Examples of the layer synthesis types include replacement, addition, and subtraction.

In each layer, rules are written between BEGIN_RULE and END_RULE. Layer attribute information includes the following. Default values will be used if there is no attribute information.

NAME the name of the layer
TYPE the type of layer synthesis (0: replacement, 1: addition, 2: subtraction)
The following provides an example of a layer description:

```
BEGIN_RULE // the beginning of a rule
NAME Layer001 // the name of the layer
TYPE 0 // replacement
...
END_RULE // the end of the rule
```

Next, various types of rules to be described between BEGIN_RULE and END_RULE will be explained.

(1) Area Rule

An area rule is given by describing area information between BEGIN_BOUNDARY and END_BOUNDARY. If there is no description of area information, a global area is used as the default value.

Area attribute information includes the following.
TYPE the area type (0: global, 1: circle, 2: rectangle)
EDGE_LENGTH the edge length Parameters corresponding to the area type, such as a position and a radius, are written between BEGIN_PARAM and END_PARAM. If the area type is a circle, four parameters for indicating center coordinates, a major radius, and a minor radius are typically required so as to express an ellipse as in the following example. If the area type is a rectangle, four parameters for indicating coordinate values at both ends of a diagonal of the rectangular area are required.

The following provides an example of the area rule description.

```
BEGIN_RULE // the beginning of a rule
NAME Layer001 // the name of the layer
TYPE 0 // replacement
BEGIN_BOUNDARY // the beginning of an area rule
TYPE 1 // the area type (1: circle)
EDGE_LENGTH 30 // the edge length
BEGIN_PARAM // the beginning of parameters corresponding to the area type
    0.0 // an x-coordinate in the center
    −5.0 // a z-coordinate in the center
    100.0 // a radius in the x direction
    120.0 // a radius in the z direction
END_PARAM // the end of parameters corresponding to the area type
END_BOUNDARY // the end of the area rule
...
END_RULE // the end of the rule
```

(2) Height Rule

A height rule is given by describing height information between BEGIN_AFFECTORHEIGHT and END_AFFECTORHEIGHT. Layers having no height information will be excluded from a height synthesis operation during layer synthesis.

Height attribute information includes the following.
TYPE the height type (0: constant value, 1: random noise (Perlin noise))
Parameters corresponding to the height type, such as a height and a noise parameter, are written between BEGIN_PARAM and END_PARAM. When the height type is a constant value, a single parameter for indicating the constant height value is required. When the height type is random noise such as Perlin noise, the seven parameters shown in the following example are required.

The following provides an example of the height rule description.

```
BEGIN_RULE // the beginning of a rule
BEGIN_AFFECTORHEIGHT // the beginning of a height rule
TYPE 1 // the height type (1: random noise (Perlin noise))
BEGIN_PARAM // the beginning of parameters corresponding to the height type
    1 // random number initializer
    4 // the number of superpositions
    60 // amplitude
    0.75 // the rate of increase (decrease) of the amplitude
    0.04 // frequency
    0.175 // the rate of increase (decrease) of the frequency
    60 // height offset
END_PARAM // the end of parameters corresponding to the height type
END_AFFECTORHEIGHT // the end of the height rule
...
END_RULE // the end of the rule
```

(3) Color Rule

A color rule is given by describing color information between BEGIN_AFFECTORCOLOR and END_AFFEC- TORCOLOR. Layers having no color information will be excluded from a color synthesis operation during layer synthesis.

Color attribute information includes the following.

TYPE the color type (0: constant value, 1: random noise (Perlin noise)).

Parameters corresponding to the foregoing color type, such as a color and a noise parameter, are written between BEGIN_PARAM and END_PARAM. When the color type is a constant value, three parameters for indicating R, G, and B color components, respectively, are required. When the color type is random noise, the nine parameters shown in the following example are required.

The following provides an example of the color rule description.

```
BEGIN_RULE // the beginning of a rule
BEGIN_AFFECTORCOLOR // the beginning of a color rule
TYPE 1 // the color type (1: random noise (Perlin noise))
BEGIN_PARAM // the beginning of parameters corresponding
to the color type
    0.2 // R component of reference color value
    1.0 // G component of reference color value
    0.5 // B component of reference color value
    1 // random number initializer
    2 // the number of superpositions
    2.0 // amplitude
    0.5 // the rate of increase (decrease) of the amplitude
    4 // frequency
    0.5 // the rate of increase (decrease) of the frequency
END_PARAM // the end of parameters corresponding to the
color type
END_AFFECTORCOLOR // the end of the color rule
...
END_RULE // the end of the rule
```

(4) Shader Rule

A shader rule is given by describing shader information between BEGIN_AFFECTORSHADER and END_AFFECTORSHADER. Layers having no shader information will be excluded from a shader synthesis operation during layer synthesis.

There is no default definition for attribute information on a shader rule. A shader rule may define a plurality of pieces of shader information. The plurality of pieces of shader information are synthesized with weights defined in the respective pieces of shader information.

The shader information is written between BEGIN_SHADER and END_SHADER. The parameters to be written are an ID, a filename, and a weight. A texture specified by the filename is mapped onto the polygon surfaces. A shader algorithm may be specified as the shader information.

The following provides an example of a shader rule description.

```
BEGIN_RULE // the beginning of a rule
BEGIN_AFFECTORSHADER // the beginning of a shader rule
    shrb01L.jpg // ID
    art/shrb01L.jpg // filename
    1.0 // weight
END_AFFECTORSHADER // the end of the shader rule
...
END_RULE // the end of the rule
```

Figures 5A, 5B:
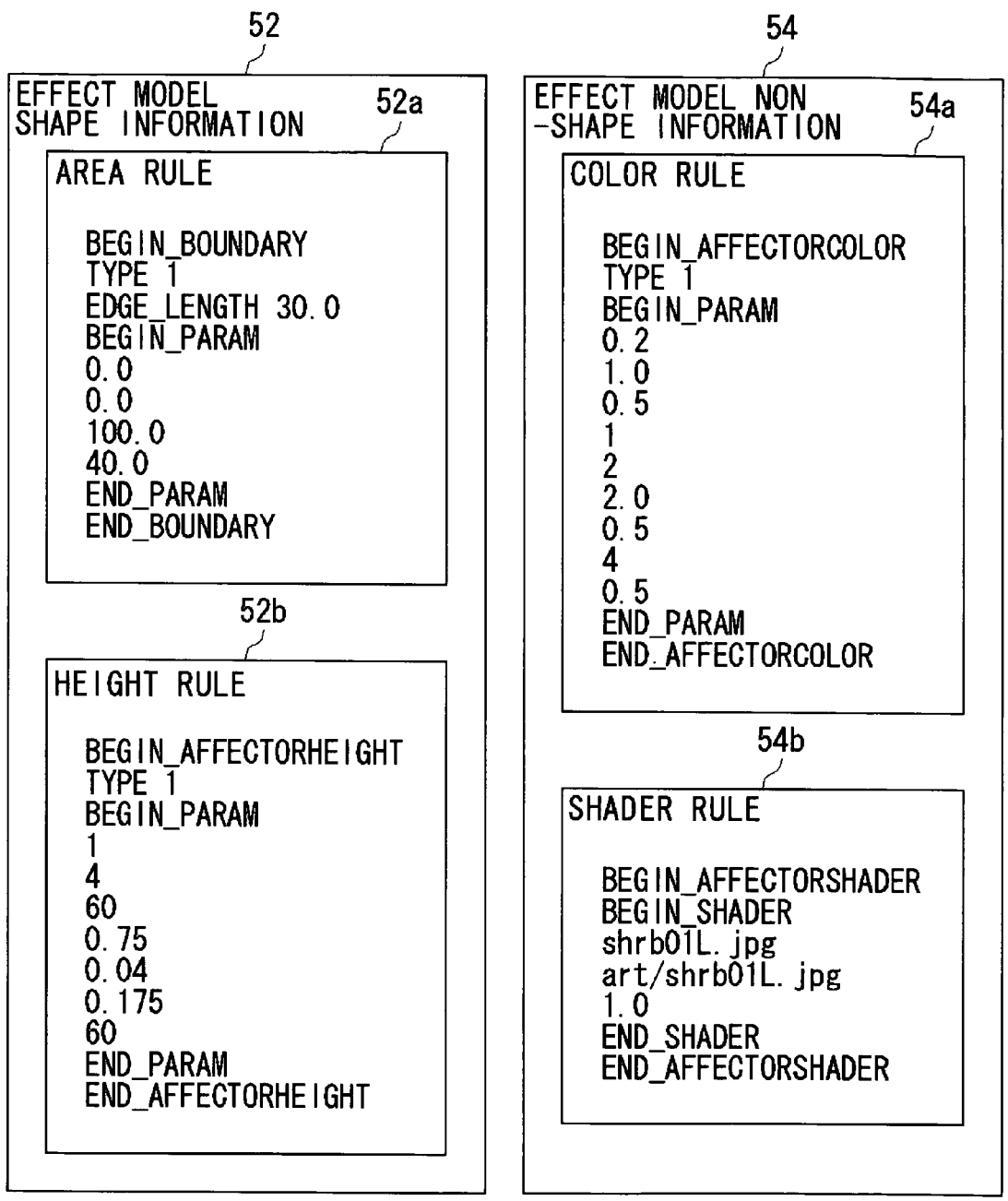
FIGS. 5A and 5B are diagrams showing an example of effect model shape information and effect model non-shape information described in an effect model file.

FIGS. 5A and 5B are diagrams showing an example of the effect model shape information 52 and the effect model non-shape information 54 which are described in the effect model file 50.

In this example, the effect model file 50 contains the effect model shape information 52 and the effect model non-shape information 54 shown in the diagrams, which are described between BEGIN_RULE and END_RULE. The layer type is 1, or addition, so that this effect model is added to the original basic model.

As shown in FIG. 5A, the effect model shape information 52 includes an area rule 52a and a height rule 52b. The effect area is specified by an elliptic area, and heights are generated from Perlin noise.

As shown in FIG. 5B, the effect model non-shape information 54 includes a color rule 54a and a shader rule 54b. Vertex colors of the polygons are generated from Perlin noise, and the texture specified by the filename is mapped onto the polygon surfaces.

Figure 6:
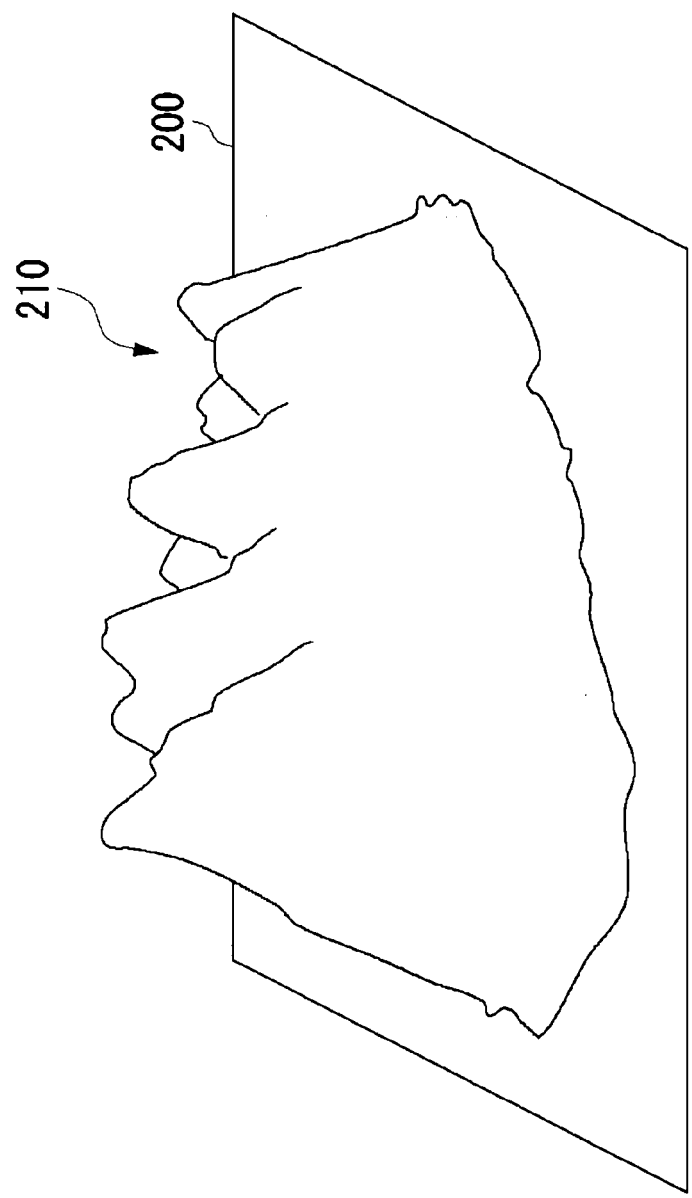
FIG. 6 is a diagram showing an example where an effect model is applied to the basic model of an object to be rendered.

FIG. 6 is a diagram showing an example where the effect model of FIGS. 5A and 5B is applied to the basic model of an object to be rendered.

The basic model of the object to be rendered is a ground surface 200 shown in the diagram. By the application of the effect model shape information 52 of FIG. 5A to the ground surface 200, a mountain 210 having random heights is formed on the effect area of the ground surface 200. Although not shown in the diagram, the effect model non-shape information 54 of FIG. 5B is also applied so that vertex colors of the mountain 210 are generated from Perlin noise, and the texture is mapped onto the surface of the mountain 210.

FIGS. 7A to 7D are diagrams showing four layers of effect model files 50a to 50d as an example where effects are defined across a plurality of layers.

The layers of effect model files 50a to 50d each contain shape information including an area rule and a height rule, and non-shape information including a color rule. The effect areas are specified by circular areas, and the heights are constant values. Colors are generated from random noise. Since no shader rule is specified, no texture will be mapped.

Figure 8:
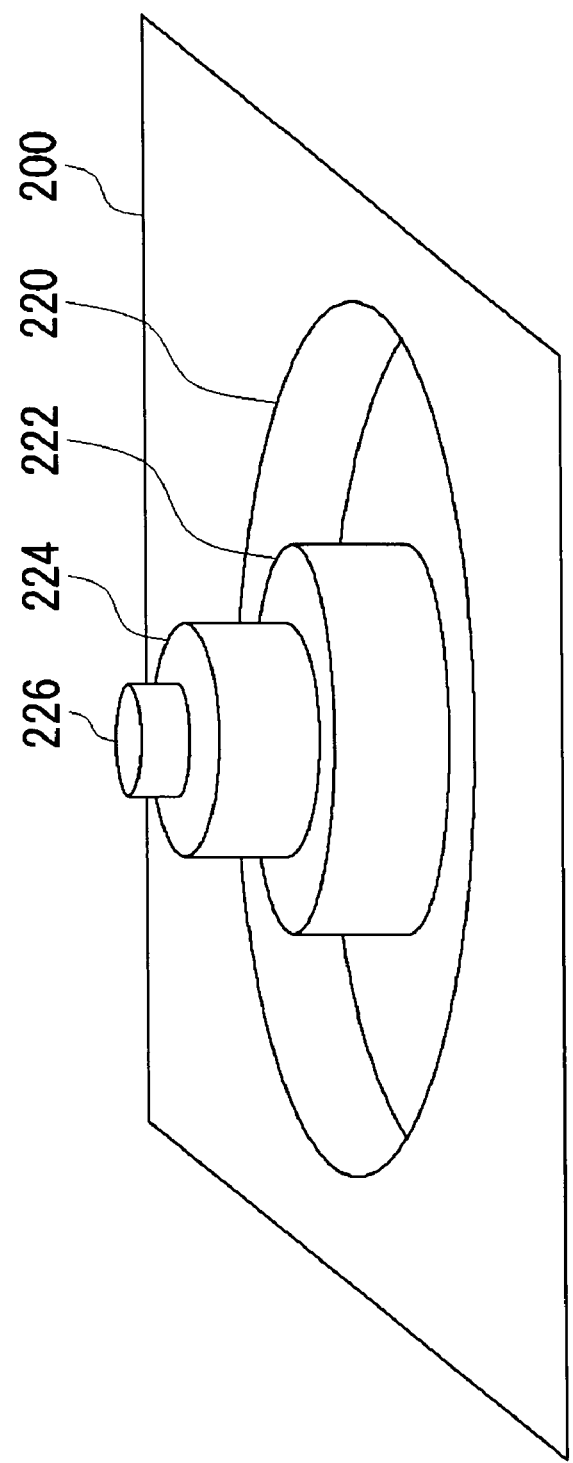
FIG. 8 is a diagram showing another example where effect models are applied to the basic model of an object to be rendered.

FIG. 8 is a diagram showing an example where the effect models of FIGS. 7A to 7D are applied to the basic model of an object to be rendered.

The basic model of the object to be rendered is a ground surface 200 shown in the diagram. Each layer of the effect models shown in FIGS. 7A to 7D is intended to create a cylinder. Initially, the effect processing unit 42 refers to the effect model file 50a of FIG. 7A, and creates a cylinder 220 with respect to the ground surface 200. Since the cylinder 220 has a height of −15, the ground surface 200 sinks. In that state, the effect processing unit 42 refers to the effect model file 50b of FIG. 7B, and overlays a cylinder 222 having a height of −5 on an effect area narrower than that of the cylinder 220.

Next, the effect processing unit 42 refers to the effect model file 50c of FIG. 7C, and overlays a cylinder 224 having a height of 5 on a still narrower area. Further, the effect processing unit 42 overlays a cylinder 226 having a height of 10 according to the effect model file 50d of FIG. 7D.

In this way, the plurality of layers of effect models are synthesized to transform the ground surface 200 into a stack of a plurality of cylinders as shown in the diagram. Although not shown in the diagram, the surfaces of the cylinders are given colors that are generated in accordance with the parameters of Perlin noise defined in the effect model files 50a to 50d, respectively.

For other examples of the effects to be described in the effect model files 50, the effect information may include effect functions that use parameters pertaining to physical quantities to act on objects to be rendered, such as gravity and the coefficient of friction. Personal information on users such as user preferences may also be written as the effect information so that the basic forms of objects to be rendered are changed, for example, according to the users' tastes.

According to the present embodiment, effect models can be applied to the basic models of objects to be rendered so that the basic models change without losing their identities, and thereby generate and render variations of the objects to be rendered to which predetermined effects have been applied. Models of the objects to be rendered need not be designed for every outcome of the effects as long as effect models are only designed for respective variations of the basic models. This resolves the troublesomeness of designing three-dimensional models of objects to be rendered so as to correspond to each individual effect.

Moreover, effect models can be applied to the basic model of an object to be rendered in a multiple fashion, thereby expressing changes occurring from a plurality of effects easily. Take, for example, the case of modeling the effect whereby meteors make craters in the ground surface. Once an effect whereby a single meteor makes an indentation in part of the ground surface is defined as a function, changes in the ground surface hit by a plurality of meteors can be created by applying the function a plurality of times with various parameters.

Since a plurality of effect models can thus be combined to obtain a synthesized outcome of the effects, it is unnecessary to create three-dimensional models for all possible combinations of the effects. This can save the trouble of designing models, and achieve various changes of the object to be rendered by combining the effect models in arbitrary ways.

According to the present embodiment, since the changes to be given to the basic models of an object to be rendered are defined as effect models, it is possible to interpolate between the objects before and after the change accurately. For example, if an effect function is defined, parameters of the effect function can be changed gradually to change the form of the object to be rendered continuously. Variation forms of the object to be rendered can thus be rendered with high precision, even including the process of change.

Second Embodiment

In the present embodiment, such applications as an online match-up game are executed in a distributed environment where a plurality of terminals are connected over a network. Users log in to a shared space of the game from their respective terminals. In that shared space, the users operate three-dimensional objects such as characters to join the game.

Figure 9:
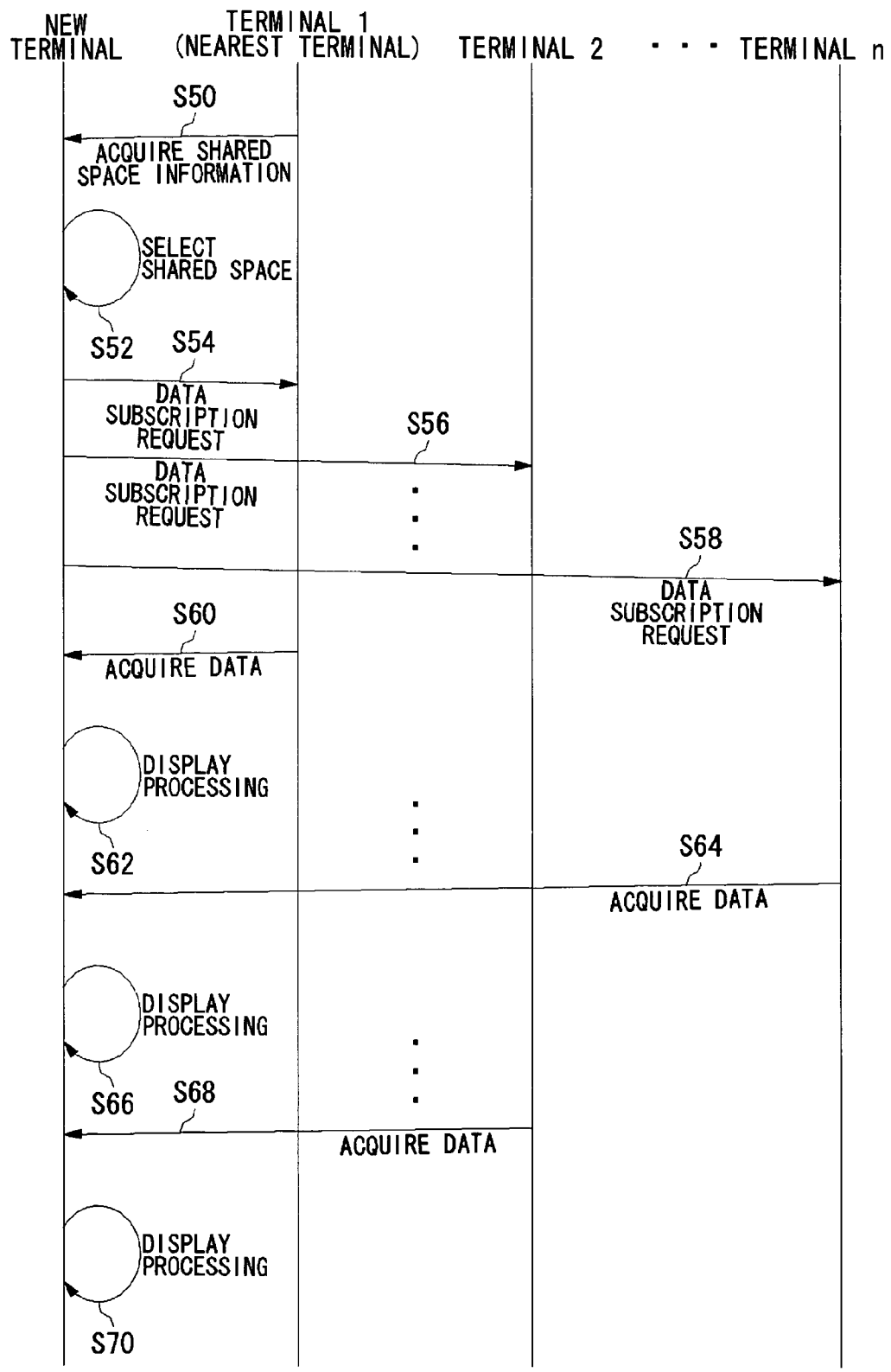
FIG. 9 is a sequence diagram for explaining the flow of data taking place between terminals in order to share a virtual space in a distributed environment.

FIG. 9 is a sequence diagram for explaining the flow of data to be held between terminals in order to share a virtual space in the distributed environment.

Suppose that a new terminal accesses the network of the distributed environment which provides services of various kinds for virtual shared spaces, and the user of that terminal logs in to a service. The new terminal initially acquires information on the various kinds of shared spaces created within the network, such as information on game, chat, and BSS shared spaces, from a nearest terminal 1 (S50).

Since all the terminals connected to the network share the information on the shared spaces, the new terminal has only to acquire the information on the shared spaces currently provided in the network from a nearest terminal.

Next, the new terminal selects a shared space for the user to join (S52). After selecting the shared space for the user to join, the new terminal acquires information on the various types of objects necessary for displaying the shared space from other terminals. Initially, the new terminal transmits a subscription request for necessary object data to all the terminals 1 to n joining in the selected shared space (S54, S56, S58). Examples of the object data to be requested of the terminals 1 to n include three-dimensional model data on characters that are operated by the users of the respective terminals 1 to n.

Receiving the subscription request, the terminals 1 to n transmit the requested object data to the new terminal in succession (S60, S64, S68). The new terminal performs display processing while receiving the object data from the terminals 1 to n in succession (S62, S66, S70). It should be noted that the information acquisition and the display processing are performed asynchronously with the transmission of the subscription request to the terminals.

Through this series of steps, the data on the objects lying in the shared space is shared among all the login terminals within the shared space, and the characters and other objects are rendered and displayed on-screen in each of the terminals. The terminals each manage the data on the objects lying in the shared space inside. When the terminals change user data on characters or the like, update information must be exchanged between the terminals in real time. In such a distributed management system, dynamic data exchanges can occur with a resulting increase in network load. To perform graphics processing on the shared space in real time, it is thus necessary to reduce the network load.

When in each terminal the user-operated character changes due to such reasons as level advancement or wearing items, all the other terminals must receive the data on the character after the change. Assuming that a single character has ten variations and each of the variations has 10,000 polygons, it follows that 100,000 polygons of data is transmitted from the terminal to all the other terminals. This increases the network load significantly and lowers the data transfer rate, thereby making real-time graphics processing difficult. When the polygon data on the updated object has a huge transfer latency, it becomes difficult to execute such real-time applications as a match-up game at a comfortable speed.

In view of the foregoing, each of the terminals is provided with the configuration of the graphics processing apparatus 100 described in the first embodiment, and the data on the basic models of the characters is stored into the storing unit. When a character model is updated, data on the effect models alone is received and the received effect models are applied to the basic model of the character stored in the storing unit, so that a variation of the form of the character is created for rendering. For this purpose, in the present embodiment, the graphics processing apparatus 100 is configured to include a receiving unit and a transmission unit so that it can transmit and receive the basic model files and the effect model files of the characters to/from the other terminals via the network.

Since effect model files are far less than basic model files in terms of amount of data, changing characters requires only a small amount of data to be transmitted between terminals. It is therefore possible to change and display characters in real time even in the distributed environment.

Moreover, in shared spaces, user characters can sometimes interact with each other. Then, effect models previously defined for a character operated by the user of a terminal can be applied to the characters operated by the users of other terminals. This makes it possible to apply unexpected effects to the characters of other users, thereby creating and displaying variations of the characters.

For example, description will be given of the case where characters of a soccer game and characters of a baseball game are exchanged, and effect models for the characters of the baseball game are applied to the soccer game.

The soccer game provides such characters as players, managers, and referees. The baseball game provides such characters as batters, pitchers, catchers, and managers.

Users who log in to the shared space can make their characters enter the shared space. In the shared space, characters of different games can thus meet and interact with each other, and characters of a game can join other games and exert effects. Here, description will be given for situations where a batter, a character of the baseball game, plays the role of a goal keeper in the soccer game and exerts effects on the soccer game.

The basic model storing units 12 of the terminals of users who play the soccer game contain the basic model file 20 of a soccer ball. The basic model file 20 contains the following information.

Shape information: vertexes, colors, texture coordinates, and the like of the soccer ball Non-shape information: directions of irradiation of light with respect to the soccer ball, textures, etc.

Connection information: polygon information

It should be noted that the polygon information is given in the form of vertex indexes for indicating connection information between vertexes and sides.

Effect model files 50 intended for batters of the baseball game are received and stored into the effect model storing units 32 of the terminals of the users who play the soccer game. The effect model file 50 contains the following information.

Shape information: spatial information on the location where a bat hits (functional expression, vertexes, or the like)

Non-shape information: the state of irradiation of light, texture, and the like in the location where the bat hits Connection information: polygon information given in the form of vertex indexes, i.e., connection information between vertexes and sides, or area information described in terms of a radius etc.

Figure 10A:
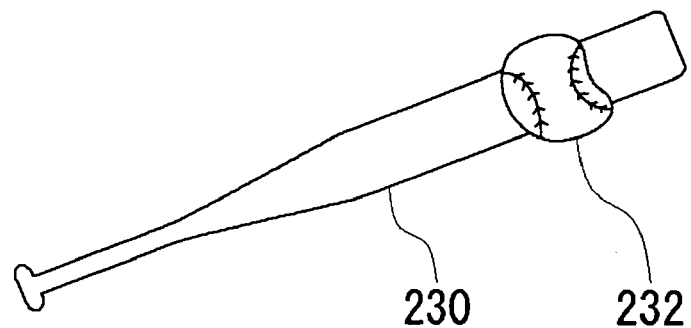
FIGS. 10A and 10B are diagrams for explaining an example where effect models of user-operated characters are applied across different games.

Effect information: a function for moving vertexes within a certain range of area FIG. 10A shows how an effect model file 50 intended for batters is applied to a baseball in the baseball game. When the batter of the baseball game swings a bat 230, the effect model described in the effect model file 50 is applied to transform the shape of a baseball 232 that meets the bat 230.

As can be seen, the effect model file 50 intended for batters of the baseball game describes in advance the effect model whereby a baseball hit by a bat undergoes a shape change depending on such physical quantities as the speed and mass of the ball, and the material, mass, swing speed, and meeting angle of the bat. Meanwhile, none of the effect model files 50 for players of the soccer game defines an effect model for changing the shape of a soccer ball when kicked.

Suppose that the batter of the baseball game plays the role of a goal keeper in the soccer game, and swings a bat in front of the goal to hit the soccer ball. Since the soccer game is not provided with the effect model whereby a ball is hit with a bat, the soccer ball ordinarily undergoes no transformation effect even when the batter playing the role of the goal keeper hits the soccer ball with the bat. Nevertheless, in the present embodiment, the effect model file 50 prepared for batters of the baseball game is transmitted from the terminal of the user who plays the baseball game to the terminals of the users who play the soccer game, and the effect model intended for batters is applied to the soccer game.

Figure 10B:
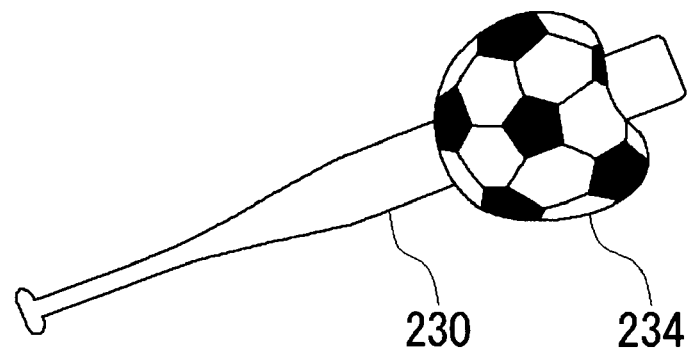

The effect area determination unit 40 determines whether or not the bat swung by the batter and the soccer ball intersect each other, and if they intersect, determines the effect area. The effect processing unit 42 applies the effect described in the effect model file 50 to the effect area. This effect is one for moving, within the effect area, the vertexes of polygons of the soccer ball that come into contact with the bat. In the effect area, the polygons of the soccer ball are changed locally in shape so that the soccer ball is dented. FIG. 10B shows how the effect model file 50 intended for batters is applied in the soccer game, and the soccer ball 234 that meets the bat 230 changes in shape.

The effect model generation unit 44 generates an updated effect model file 60 intended for goal keepers of the soccer game from the effect model file 50 intended for batters of the baseball game. The generated updated effect model file 60 for goal keepers contains the following information.

Shape information: spatial information on the location where hit by the bat (functional expression, vertexes, or the like)

Non-shape information: the state of irradiation of light, texture, and the like in the location where hit by the bat Connection information: index information on polygons, or area information expressed in terms of radius, or the like Effect information: a function for moving vertexes in a certain range of area The effect model file 50 intended for batters of the baseball game describes the effect model of an effect that results from the action of hitting with a bat. On the other hand, the updated effect model file 60 intended for goal keepers of the soccer game describes an effect model as to the imprint of being hit with a bat.

The effect model generation unit 44 registers the generated updated effect model file 60 intended for goal keepers of the soccer game into the effect model storing unit 32. The registered updated effect model file 60 intended for goal keepers is subsequently used as one of effect models to be applied to the soccer ball that is handled by goal keepers.

Description will now be given of a collision determination to be made by the effect area determination unit 40. Suppose that the effect model file 50 intended for batters of the baseball game describes the effect resulting from the action of hitting a ball with a bat, and has an effect function for making a dent in the ball when the ball lies within the range of the swing of the bat. The effect area determination unit 40 makes a brief collision determination depending on whether a soccer ball lies within the range where the batter swings the bat, and then completes the collision determination by searching for a contact surface between the bat and the ball.

Now, description will be given of another example where characters are exchanged among a horse racing game, a car racing game, and a dinosaur hunting game.

Figure 11A:
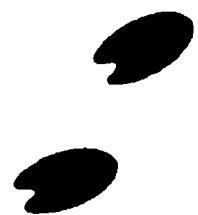
FIGS. 11A to 11D are diagrams for explaining another example where effect models of user-operated characters are applied across different games.
Figure 11B:
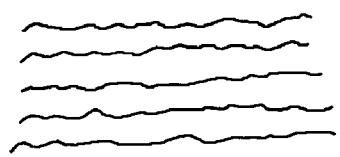
Figure 11C:

Race horses, or characters of the horse racing game, have an effect model of leaving hoof prints on the ground as shown in FIG. 11A. Cars, or characters of the car racing game, have an effect model of leaving tire tread marks on the ground as shown in FIG. 11B. Dinosaurs, or characters of the hunting game, have an effect model of leaving dinosaur footprints on the ground as shown in FIG. 11C.

Figure 11D:
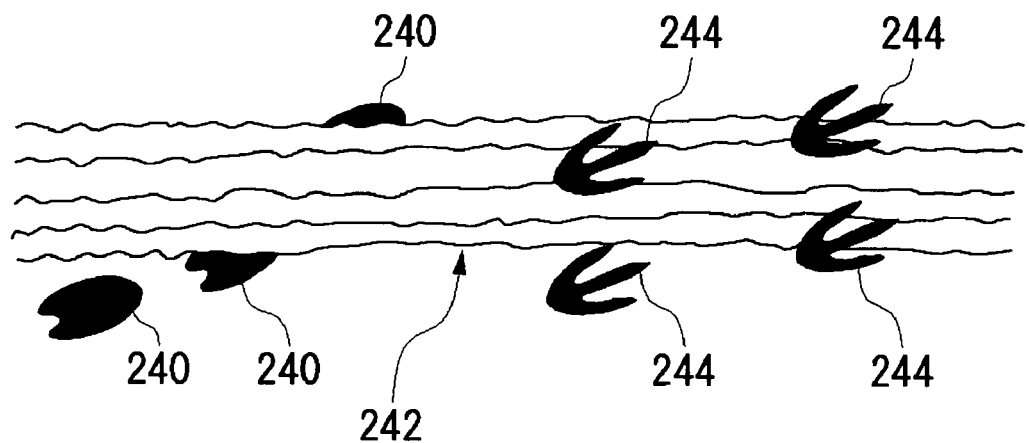

Suppose that cars, or a character of the car racing game, and a dinosaur, or a character of the hunting game, join the horse racing game and race with race horses. Here, as shown in FIG. 11D, hoof prints 240 are formed on the ground, or an object of the horse racing game, by the effect model for race horses of the horse racing game. Tire tread marks 242 are synthesized thereon by the effect model for cars of the racing game, and dinosaur footprints 244 are further synthesized thereon by the effect model for dinosaurs of the hunting game.

It is beyond the scope of the assumption of the horse racing game that there will be any car or dinosaur races with horses. The effect models for leaving tire tread marks and dinosaur footprints on the ground are thus not defined in the first place. Since the characters of the car racing game and the hunting game join the horse racing game, the new effect models of leaving tire tread marks and dinosaur footprints on the ground are introduced to the horse racing game.

For other examples than the foregoing, characters of different games may interact with each other. When a character A of a game A and a character B of a game B encounter each other in a shared space, effect models defined for the character A of the game A may be applied to the character B of the game B. Effect models defined for the character B of the game B may in turn be applied to the character A of the game A.

Aside from the interactions between characters of different games, it is also possible even within an identical game to provide new character models or new character effects to users as update information over the network when necessary. In this case, effect model files not assumed in the old version of the game are transmitted to the terminals of users who use the old version, so that the effects of the new version are added to the characters of the old version to create new variations of the characters.

According to the present embodiment, effect models on characters and other objects to be rendered can be exchanged between different games or applications so that the effects are applied to each other's objects as long as the basic models and effect models on the objects to be rendered are prepared. This eliminates the need to prepare object models for all possible effects in each individual application in advance, and makes it possible to create variations of the objects easily by just sharing the effect models between the applications. As a result, it is possible to enhance the variety of the characters and other objects in shape.

Conventionally, exchanging character models between different games resulted only in that each other's characters simply appeared on-screen. Even when characters interacted with each other, the result of the interaction could not be displayed unless the interaction was modeled in advance. According to the present embodiment, in contrast, effect models can be exchanged to apply unexpected effects to characters even if interactions are not modeled in advance. As a result, it is possible to change the forms of the characters in various ways more easily. Moreover, when effect models are exchanged between different games, an outcome of the effects that has never been expected in an individual game alone is applied to the characters. This allows for a wider variety of ways to enjoy the games. There is also another effect whereby the model design of game characters can be facilitated and unexpected ways of game play can be found.

Up to this point, the present invention has been described in conjunction with the embodiments thereof. The foregoing embodiments have been given solely by way of illustration. It will be understood by those skilled in the art that various modifications may be made to combinations of the foregoing components and processes, and all such modifications are also intended to fall within the scope of the present invention.

What is claimed is:

1. A graphics processing apparatus comprising:
    a storing unit that stores a plurality of basic model files and a plurality of effect model files, a basic model file describing a basic model for defining a three-dimensional basic form of an object to be rendered, and an effect model file describing an effect to be applied to the basic model in order to create a variation form while maintaining identity of the basic form of the object to be rendered;
    an effect processing unit that applies an effect described in the effect model file to a basic model, thereby changing the basic model; and
    a graphics processing unit that performs graphics processing for displaying a variation of the object to be rendered on-screen based on the basic model changed, wherein
    one or more effect model files are associated with a player in a game among a plurality of games played in a virtual shared space, and wherein
    when a player of a first game enters into a second game that is ongoing, the effect model files, which have been prepared for rendering effects on an object in the first game, are transmitted with the player to the second game, and when an object in the second game encounters the player who has entered, one or a plurality of effect model files are applied to the basic model file of the object in the second game by the effect processing unit while the second game is ongoing, thereby altering the basic model of the object of the second game while maintaining the second game in the virtual shared space, and
    the graphics processing unit performs graphics processing for displaying unanticipated variations of the object in the second game based on the altered basic model of the object.

2. The graphics processing apparatus according to claim 1, wherein
    the effect processing unit applies to the basic model a plurality of different effects described in a plurality of different effect model files stored in the storing unit in a multiple fashion, thereby changing the basic model.

3. The graphics processing apparatus according to claim 1, wherein
    the effect described in the effect model file is one for changing the basic model locally in shape.

4. The graphics processing apparatus according to claim 2, wherein
    the effect described in the effect model file is one for changing the basic model locally in shape.

5. The graphics processing apparatus according to claim 1, wherein
    the effect described in the effect model file is given by a function for moving vertexes of at least part of polygons of the basic model.

6. The graphics processing apparatus according to claim 1, wherein
    the effect described in the effect model file is given by a function for changing vertex color of polygons of the basic model.

7. The graphics processing apparatus according to claim 1, wherein
    the effect described in the effect model file is given by a description specifying a texture to be mapped onto a polygon surface of the basic model.

8. A graphics processing apparatus connected to a network, for performing graphics processing of an object to be rendered in a virtual shared space, the apparatus comprising:
    a receiving unit that receives, via the network, a plurality of basic model files and a plurality of effect model files, a basic model file describing a basic model for defining a three-dimensional basic form of the object to be rendered and an effect model file describing an effect to be applied to the basic model in order to create a varying form while maintaining the identity of the basic form of the object to be rendered;
    an effect processing unit that applies an effect described in the received effect model file to a basic model, thereby changing the basic model; and a graphics processing unit that performs graphics processing for displaying a variation of the object to be rendered on-screen based on the basic model changed, wherein one or more effect model files are associated with a player in a game among a plurality of games played in a virtual shared space, and wherein when a player of a first game enters into a second game that is ongoing, the effect model files, which have been prepared for rendering effects on an object in the first game, are transmitted with the player to the second game, and when an object in the second game encounters the player who has entered, one or a plurality of effect model files are applied to the basic model file of the object in the second game by the effect processing unit while the second game is ongoing, thereby altering the basic model of the object of the second game while maintaining the second game in the virtual shared space, and the graphics processing unit performs graphics processing for displaying unanticipated variations of the object in the second game based on the altered basic model of the object.

9. A graphics processing method for performing on a graphics processing apparatus comprising:

acquiring an effect model file, if the application of a predetermined effect to a basic model for defining a three-dimensional basic form of an object to be rendered creates a varying form, while maintaining the identity of the basic form of the object to be rendered, the effect model file describing the predetermined effect to be applied to the basic model;

applying the predetermined effect described in the acquired effect model file, the effect model file being associated with a player in a game among a plurality of games played in a virtual shared space, and wherein when a player of a first game enters into a second game that is ongoing, the effect model files, which have been prepared for rendering effects on an object in the first game, are transmitted with the player to the second game, and when an object in the second game encounters the player who has entered, one or a plurality of effect model files are applied to the basic model file of the object in the second game by the effect processing unit while the second game is ongoing, thereby altering the basic model of the object of the second game while maintaining the second game in the virtual shared space; and performing graphics processing for displaying unanticipated variations of the object on-screen in the second game based on the altered basic model of the object.

10. A non-transitory computer-readable medium encoded with a program for use with a computer system comprising:

a program module for acquiring and storing an effect model file, if the application of a predetermined effect to a basic model for defining a three-dimensional basic form of an object to be rendered creates a varying form, while maintaining the identity of the basic form of the object to be rendered, the effect model file describing the predetermined effect to be applied to the basic model;

a program module for applying the predetermined effect described in the effect model file, the effect model file being associated with a player in a game among a plurality of games played in a virtual shared space, and wherein when a player of a first game enters into a second game that is ongoing, the effect model files, which have been prepared for rendering effects on an object in the first game, are transmitted with the player to the second game, and when an object in the second game encounters the player who has entered, one or a plurality of effect model files are applied to the basic model file of the object in the second game by the effect processing unit while the second game is ongoing, thereby altering the basic model of the object of the second game while maintaining the second game in the virtual shared space; and a program module thr performing graphics processing for displaying unanticipated variations of the object on-screen in the second game based on the altered basic model of the object.

* * * * *